United States Patent [19]

Amano et al.

[11] Patent Number: 5,414,589

[45] Date of Patent: May 9, 1995

[54] CAPACITOR HAVING A CHANGEABLE DIELECTRIC CAPACITY AND MANUFACTURING METHOD THEREOF

[75] Inventors: Koshi Amano; Satoru Yatake, both of Kyoto, Japan

[73] Assignee: Rohm Co., Ltd., Kyoto, Japan

[21] Appl. No.: 72,457

[22] Filed: Jun. 7, 1993

[51] Int. Cl.$^6$ ............................................. H01G 1/14
[52] U.S. Cl. ............................ 361/306.3; 361/306.1; 361/308.1; 361/277; 361/330
[58] Field of Search ................. 361/306.3, 306.1, 307, 361/308.1, 313, 321.2, 328–330, 309, 271; 29/277, 278, 25.42

[56] References Cited

U.S. PATENT DOCUMENTS 3,586,933  6/1971  Bonini ............................ 361/321.1

FOREIGN PATENT DOCUMENTS 2-058816   2/1990  Japan ................. 361/321.2
2-246307  10/1990  Japan ................. 361/328
5-021269   1/1993  Japan ................. 361/328

*Primary Examiner*—Bruce A. Reynolds
*Assistant Examiner*—Michael D. Switzer
*Attorney, Agent, or Firm*—Cushman, Darby & Cushman

[57] ABSTRACT

The present invention provides a capacitor having a changeable dielectric capacity which has advantages in changing the dielectric capacity and increasing the maximum dielectric capacity. The capacitor having a changeable dielectric capacity comprises ceramic main body part 1 in which a first and second internal electrodes 2a and 2b are formed. Four terminal electrodes 3 are formed apart on a face of the ceramic main body part 1. A common terminal electrode 4 is formed on the ceramic main body part 1 so that it connects with the internal electrodes 2a and 2b. To these terminal electrodes 3 and 4 are connected their respective lead wires 5 for wiring.

13 Claims, 8 Drawing Sheets

FIG. 12. A
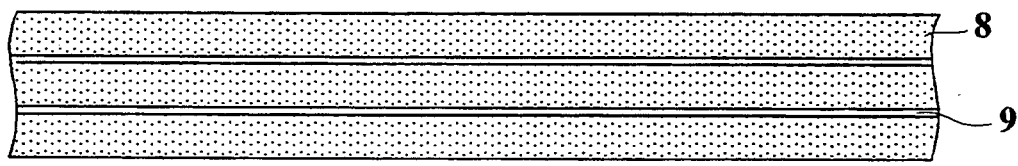
FIG. 12 B
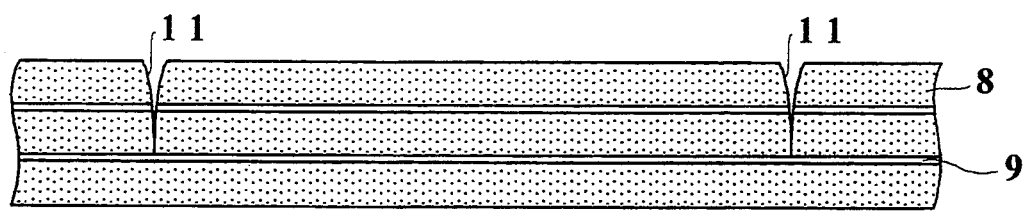
FIG 12. C
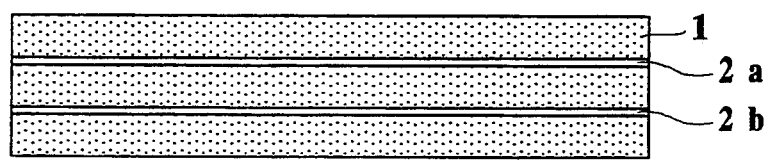
FIG. 12 D
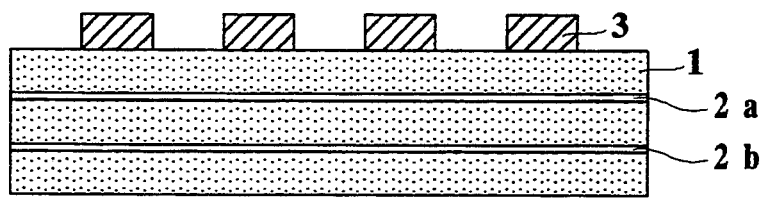
FIG. 12 E
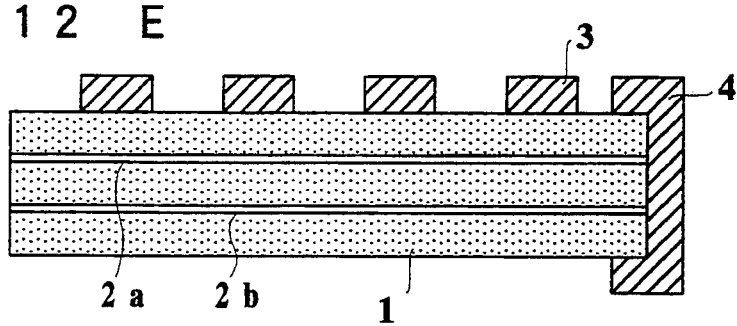

CAPACITOR HAVING A CHANGEABLE DIELECTRIC CAPACITY AND MANUFACTURING METHOD THEREOF

BACKGROUND OF THE INVENTION

1. Field of the Invention

The present invention relates to a capacitor having a changeable dielectric capacity and, more particularly, improvement in the reliability thereof.

2. Description of the Related Art

Nowadays, "network type" capacitors are known to a kind of capacitors. "Network type" capacitors are capacitors which have a changeable dielectric capacity.

An embodiment of a "network type" capacitor is shown in FIG. 1 in perspective view. FIG. 2 is a II—II sectional view of FIG. 1. FIG. 3 is III—III sectional view of FIG. 1.

Referring to FIGS. 1, 2 and 3, this capacitor comprises a main body part 61 of ceramic such as barium titanate (BaTiO$_3$) and terminal electrodes which are formed using a paste of mainly silver (Ag). These terminal electrodes consist of a common terminal electrode 62a and a plurality of face terminal electrodes 62b facing the common terminal electrode 62a. The common terminal electrode 62a is formed on a face of main ceramic body part 61 as shown in FIG. 2 and the plurality of face terminal electrodes 62b are formed apart on a face of main ceramic body part 61. Lead wires 63 are each connected to these terminal electrodes 62a and 62b.

After this wiring, the ceramic main body part is covered with a layer 64 of epoxy resin or the like which is self-extinguishing.

Meanwhile, size of typical "network type" capacitor will be referred to below. Since the typical "network type" capacitor has nine capacitor elements, the typical "network type" capacitor is about 24 mm in width and 10 mm in length. Meanwhile, the ceramic main body part requires that its thickness is more than 0.4 mm because of strength of breakdown. Typically, an interval P between two face terminal electrodes is from 2.45 mm to 1.778 mm (see FIG. 2). When the thickness of face terminal electrode is S mm, difference of P−S is from 0.5 mm to 0.7 mm (see FIG. 2).

However, the above-described "network type" capacitor has the following problems.

FIG. 4 shows this "network type" capacitor in equivalent circuit view. As shown in FIG. 4, the "network type" capacitor has four capacitor elements C1,C2,C3 and C4. Their respective dielectric capacity C is given by the following formula:

$$C = E_s \times E_0 \times S/T$$

wherein "Es" represents the relative dielectric constant of ceramic material, "E$_0$" represents the dielectric capacity of a vacuum, "S" represents the an effective dimension of the face terminal electrode influencing its dielectric capacity, and "T" represents the thickness of the main ceramic body part.

Referring to the above formula, each dielectric capacity depends on its relative dielectric constant "Es", its effective dimension of its face terminal electrode and the thickness of the main ceramic body part. Therefore, when the relative dielectric constant, the effective dimension and the thickness are all constant in the "network type" capacitor it is difficult to make a variety of dielectric capacities. In order to increase dielectric capacity without enlarging the effective dimension, it is necessary to thin the ceramic main body part. However, there is a limit to the degree of thinness of the ceramic main body part because the capacitor breaks down when the ceramic body part is too thin.

OBJECTS AND SUMMARY OF THE INVENTION

It is an object of the present invention to provide a capacitor having a changeable dielectric capacity which has advantages in changing the dielectric capacity and increasing the maximum dielectric capacity.

According to an embodiment of the present invention, a capacitor having a changeable dielectric capacity comprises:

a) a main body part of dielectric ceramic, b) a first internal electrode formed in the main body part, c) a first plurality of terminal electrodes formed on a face of the main body part so that at least one the first terminal electrode faces the first internal electrode, and d) a first common terminal electrodes formed on a face of the main body part so that the common terminal electrodes connects with the internal electrode.

According to an embodiment of the present invention, a method for manufacturing a capacitor having a changeable dielectric capacity comprises the steps of:

a) preparing a ceramic main body part having a first and a second internal electrodes therein, b) applying a paste onto a face of the ceramic main body part to form a first plurality of terminal electrodes so that at least one the first terminal electrode faces the first internal electrode, c) drying and calcining the resulting main body part, d) applying a paste onto a face of the ceramic main body part to form a first common terminal electrode so that the first common terminal electrode connects with at least one the first internal electrode, and e) drying and calcining the resulting main body part.

While the novel features of the invention are set forth in a general fashion, particularly in the appended claims, the invention, both as to organization and content, will be better understood and appreciated, along with other objects and features thereof, from the following detailed description taken in conjunction with the drawings.

10B is a sectional view showing a capacitor having a changeable dielectric capacity according to another embodiment of the present invention.

Figure 10:
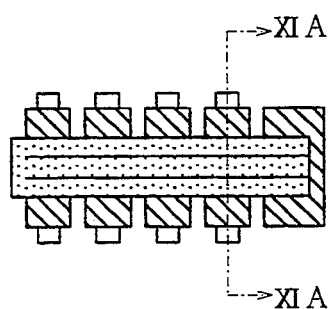
FIG. 10A is a sectional view showing a capacitor having a changeable dielectric capacity according to another embodiment of the present invention and FIG.
Figure 10:
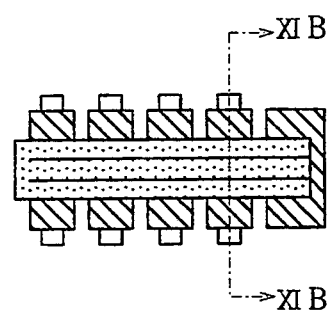
Figure 11:
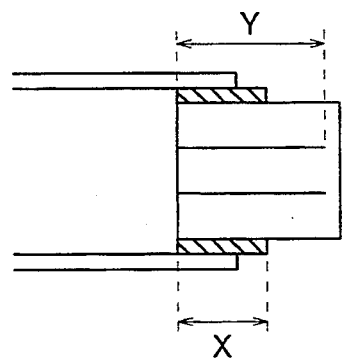
Figure 11:
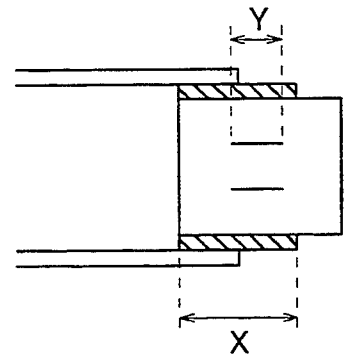

FIG. 11A is a XIA—XIA sectional view of FIG. 10A and FIG. 11B is a XIB—XIB sectional view of FIG. 10B.

Figure 1:
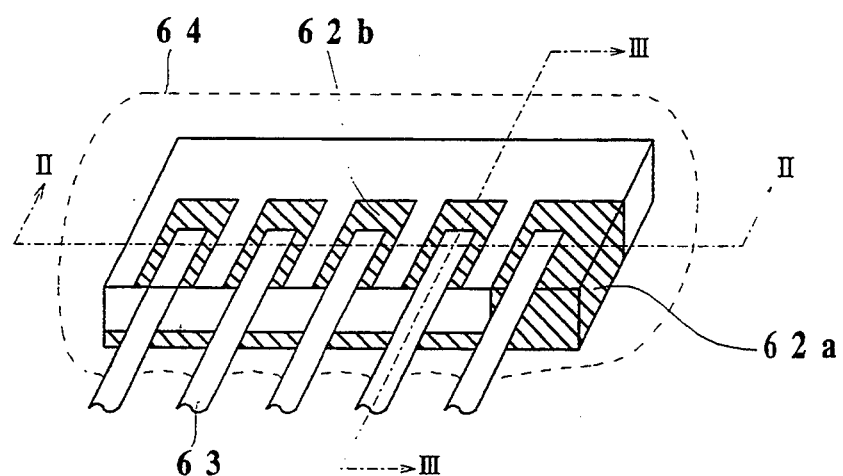
FIG. 1 is a perspective view showing a capacitor having a changeable dielectric capacity.
Figure 2:
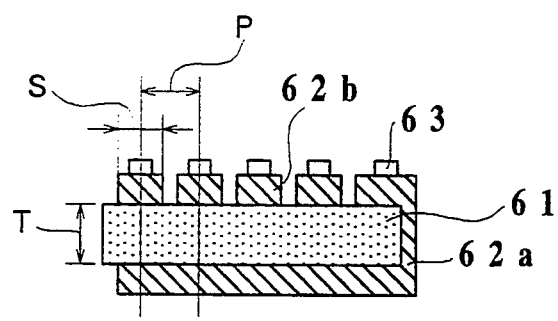
FIG. 2 is a II—II sectional view of FIG. 1.
Figure 3:
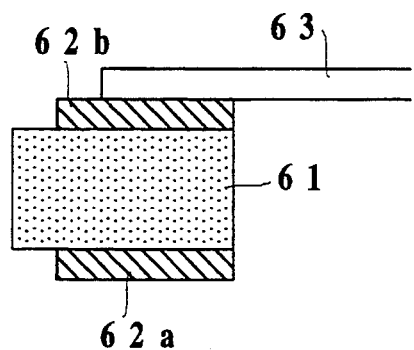
FIG. 3 is a III—III sectional view of FIG. 1.
Figure 4:
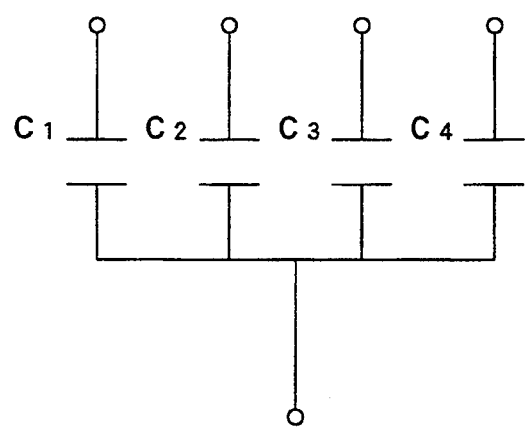
FIG. 4 is an equivalent circuit showing the capacitor having a changeable dielectric capacity of FIG. 1.
Figure 5:
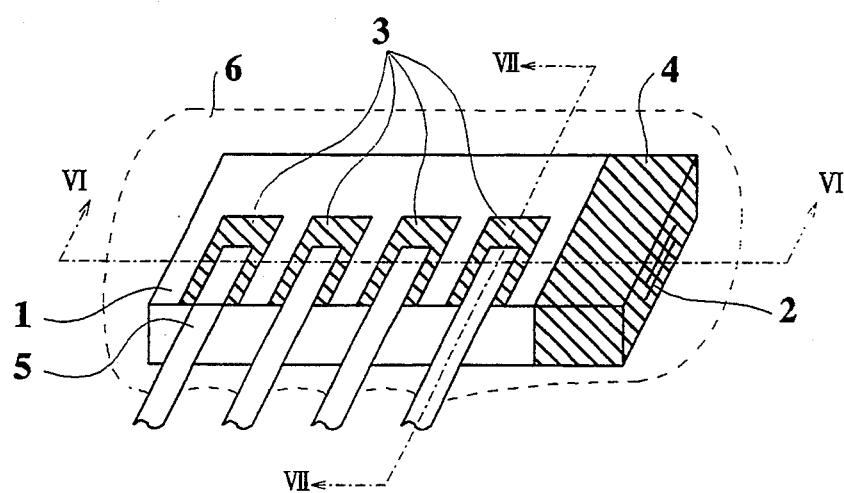
FIG. 5 is a perspective view showing a capacitor having a changeable dielectric capacity according to an embodiment of the present invention.

FIGS. 12A through 12D are sectional views showing a method for manufacturing the capacitor of FIG. 5 according to an embodiment of the present invention.

Figure 13:
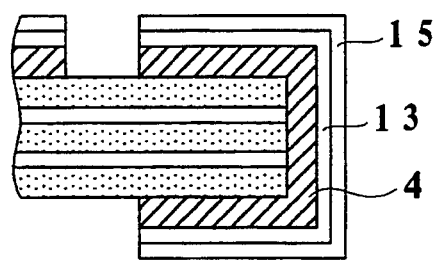

FIG. 13 is a partial sectional view explaining a method for manufacturing a capacitor having a changeable dielectric capacity according to another embodiment of the present invention.

Figure 14:
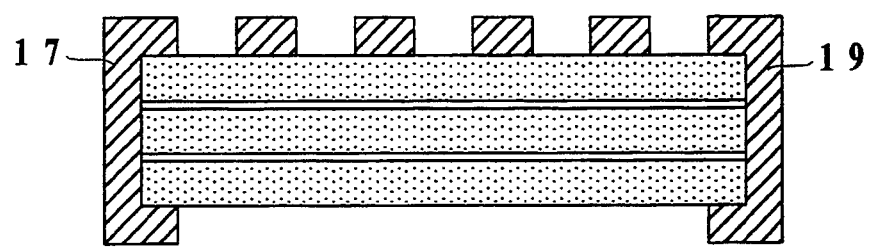

FIG. 14 is a sectional view showing a capacitor having a changeable dielectric capacity according to another embodiment of the present invention.

DESCRIPTION OF THE PREFERRED EMBODIMENT

Figure 6:
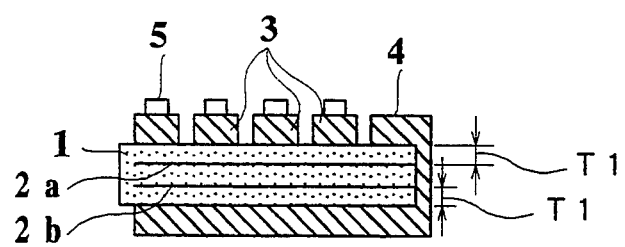
FIG. 6 is a VI—VI sectional view of FIG. 5.
Figure 7:
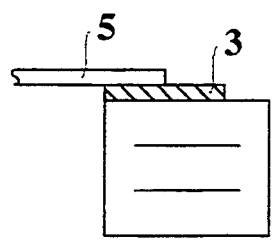
FIG. 7 is a VII—VII sectional view of FIG. 5.

FIG. 5 shows a capacitor having a changeable dielectric capacity according to one embodiment of the present invention. FIG. 6 is a VI—VI sectional view of FIG. 5. FIG. 7 is a VII—VII sectional view of FIG. 5. This capacitor is capable of changing its capacity and is referred to as a "network type" capacitor hereafter. Note that the largest capacity which the "network type" capacitor has is referred to as maximum dielectric capacity.

This "network type" capacitor comprises a ceramic main body part 1 in which a first and a second internal electrodes 2a and 2b are formed. Four terminal electrodes 3 which are a first plurality of terminal electrodes are formed apart on a face of the ceramic main body part 1 as shown in FIG. 6. A common terminal electrode 4 which is a common first terminal electrode is formed on the ceramic main body part so that it connects with the internal electrodes 2a and 2b. To these terminal electrodes 3 and 4 are connected their respective lead wires 5 for wiring.

The "network type" capacitor has four capacitor elements where a distance between the first internal electrode 2a and the first terminal electrode 3 or the two plates is T1, as shown in FIG. 6.

Note that the internal electrode 2b is necessary when it is desired to increase the number of capacitor elements.

Figure 8:
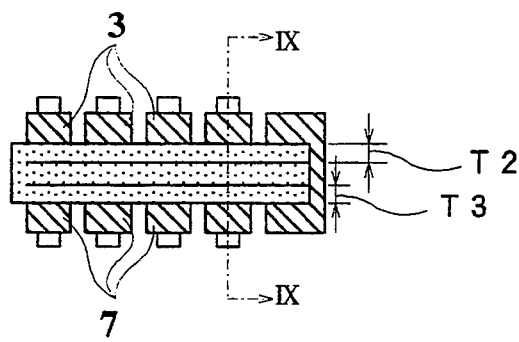
FIG. 8 is a sectional view showing a capacitor having a changeable dielectric capacity according to another embodiment of the present invention.
Figure 9:
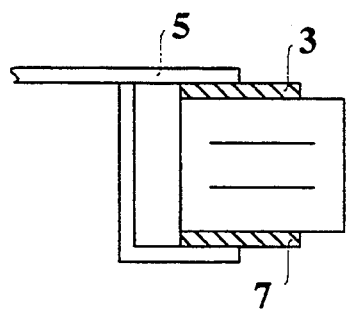
FIG. 9 is a IX—IX sectional view of FIG. 8.

FIG. 8 shows in perspective view a "network type" capacitor according to another embodiment of the present invention. FIG. 9 is a an IX—IX sectional view of FIG. 8. To form this "network type" capacitor, such a "network type" capacitor as FIG. 6 is subjected to a step wherein four terminal electrodes 7, which are a second plurality of terminal electrodes, are formed apart on a face opposite to the face on which the first terminal electrodes 3 are formed. Note that this "network type" capacitor have a set of four capacitor elements which has a distance of T2 between two plates, and another set of four capacitor elements which have a distance of T3 between two plates.

Dielectric capacity of each capacitor element depends on an effective dimension of a terminal electrode influencing its dielectric capacity based on the above-described formula. Therefore, in the "network type" capacitor of FIG. 9, positions of both the internal electrodes and the terminal electrodes influence the dielectric capacity of each capacitor elements to a large extent. This fact leads to a problem with scatter of the "network type" capacitor.

The following "network type" capacitors according to another embodiment of the present invention can prevent this problem. Two "network type" capacitors according to the embodiment will be described below with reference to the figures.

FIGS. 10A and 10B show the two "network type" capacitors in perspective view respectively. FIGS. 11A and 11B are XIA—XIA and XIB—XIB sectional views of FIGS. 10A and 10B, respectively. Note that the two "network type" capacitors are the same as the capacitor of FIG. 8 except for the size of first and second internal electrodes or terminal electrodes.

As shown FIG. 11A and 11B, to prevent the above problem it is necessary that length X of the terminal electrode and length Y of the internal electrode should be quite different. FIG. 11A shows that the length X is much longer than the length Y, and FIG. 11B shows that the length Y is much longer than the length Y.

As described above, in these embodiments the positions of the first and second internal electrodes and the terminal electrodes have little influence on the dielectric capacity of capacitor elements.

A method for manufacturing the "network type" capacitor of FIG. 5 will be described below with reference to the figures.

At first, ceramic slip consisting of one hundred parts of dielectric ceramic of barium titanate ($BaTiO_3$), seven through fifteen parts of bonding material and thirty parts of solvent is formed into a ceramic sheet of 15 $\mu$m through 50 $\mu$m in thickness by a forming machine.

Referring to FIG. 12A, this ceramic sheet is then cut in a plurality of parts of a predetermined size, and the plurality of cut ceramic sheets 8 are stacked. With this stacking step, two other sheets 9 having a plurality of internal electrodes are each inserted between the ceramic sheets 8 in a desired position by screen printing technique. The accumulated sheets are pressed at a pressure of 300 kg/cm² in an atmosphere of temperature 80° C. through 150° C.

Referring to FIG. 12B, in this pressed body are then formed a plurality of notches 11 for dividing it into a plurality of main body parts after calcining it. The resulting body is subjected to a calcining step at a maximum temperature of 1300° C.

Referring to FIG. 12C, after the calcining step, the calcined body is bent so that the calcined body is divided into a plurality of main body parts 1. These ceramic main body parts 1 are each subjected to a grinding step or a sandblasting step to expose the internal electrodes 2a and 2b.

After being cleaned and dried, or air-blown, referring to FIG. 12D, the ceramic main body part 1 is subjected to a step of forming a first plurality of terminal electrodes 3, wherein onto a face of the ceramic main body part 1 is applied a paste into which silver (Ag) powder or a mixture of a silver powder and a palladium powder, glass frit, ethyl cellulose and a solvent are mixed. Note that the first plurality of terminal electrodes 3 are formed on the main body part 1 so that at least one terminal electrode may face the internal electrode. Thereafter, the ceramic main body part 1 is dried at a temperature of about 150° C. for fifteen minutes and then calcined at a temperature of about 850° C.

Similarly, referring to FIG. 12E, a first common terminal electrode 4 is formed on the main body part 1 using the above paste so that the first common terminal electrode connects with the internal electrodes 2a and 2b.

Then, lead wires are attached to the plurality of terminal electrodes and the common terminal electrode using soft solder (not shown).

In alternative preferred embodiments soft solder 13 and nickel 15 may be plated on the terminal electrodes 3 and 4, as shown in FIG. 13. These layers 13 and 15 lead the facts that the lead firmly connects with the terminal electrodes because nickel is receptive to soldering. Also, these layers prevent silver of terminal electrodes from melting into the soft solder. Therefore, the alternative embodiment has advantages in obtaining a desired dielectric capacity.

After this wiring, the ceramic main body part is covered with a layer 6 of epoxy resin or the like which is self-extinguishing. Note that the ceramic main body part can be used without lead wires.

In the above embodiments, it is possible in technique to decrease the distance between the two plates of the capacitor elements to 10 μm.

As is described above, the first plurality of terminal electrodes and the second plurality of terminal electrodes can be formed on the one face and the opposite face of the ceramic main body part, respectively. Such a "network" capacitor has advantages in increasing the maximum dielectric capacity.

When the "network type" capacitor of FIG. 6 is subjected to a step wherein four terminal electrodes are formed apart on a face opposite to the face on which the first four terminal electrodes are formed, each eight capacitor elements has the same dielectric capacity because the distance between two plates is the same.

When, in alternative embodiments, first and second common terminal electrodes 17 and 19 are formed on a face and an opposite face of a ceramic main body part respectively as shown in FIG. 14, either of the first and second common terminal electrodes can be used to fabricate a capacitor.

Although in the above embodiments the four terminal electrodes is used as the first plurality or the second plurality of terminal electrodes, in alternative embodiments any other number of terminal electrodes may be used.

Although in the above embodiments barium titanate (BaTiO$_3$) is used as the dielectric ceramic, in alternative embodiments there is used any other dielectric ceramic such as high dielectric ceramic and temperature compensated ceramic.

Note in the above-described embodiments that the first and second internal electrodes are formed using an ink made up of a metal powder of silver/palladium (Ag/Pd) or palladium (Pd), polar bonding material and polar solvent.

Note in the above-described embodiments that the terminal electrodes and the common terminal electrodes are formed using a paste made up of silver (Ag) powder or a mixture of a silver powder and a palladium powder, glass frit, ethyl cellulose and a solvent.

In the above-described manufacturing method, the first and second internal electrodes can be formed in a desired position in the ceramic main body part. Therefore, it is easy to set a desired dielectric capacity on capacitor elements. Also, it is easy to manufacturing the capacitor having a changeable dielectric capacity.

In the "network type" capacitors of the above-described embodiments, the maximum dielectric capacity thereof can be increased without thinning the ceramic main body part. Therefore, the "network type" capacitors have advantages in strength of breakdown.

Similarly, the maximum dielectric capacity can be increased without enlarging the effective dimension of terminal electrode. Therefore, it is easy to integrate the "network type" capacitor.

Although the invention has been described in its preferred form with a certain degree of particularity, it is understood that the present disclosure of the preferred form has been changed in the details of its construction and any combination and arrangement of parts may be resorted to without departing from the spirit and the scope of the invention as hereinafter claimed.

What is claimed is:

1. A capacitor having a changeable dielectric capacity comprising:
   a) a main body part of dielectric ceramic,
   b) a first internal electrode formed in the main body part,
   c) a first plurality of terminal electrodes formed on a face of the main body part so that at least one of the first terminal electrodes faces the first internal electrode,
   d) a first common terminal electrode formed on a face of the main body part so that the common terminal electrode connects with the internal electrode, and
   e) a second common terminal electrode formed on a face opposite to the face on which the first common terminal electrode is formed.

2. A capacitor having a changeable dielectric capacity according to claim 1,
   wherein barium titanate is used as ceramic material.

3. A capacitor having a changeable dielectric capacity according to claim 1,
   wherein the first internal electrode faces all of the first plurality of terminal electrodes.

4. A capacitor having a changeable dielectric capacity according to claim 1, further comprising:
   a second internal electrode formed in the main body part.

5. A capacitor having a changeable dielectric capacity according to claim 1, further comprising:
   a layer of nickel and soft solder is formed on each of the first terminal electrodes and the first common terminal electrode.

6. A capacitor having a changeable dielectric capacity comprising:
   a main body part of dielectric ceramic,
   a first internal electrode formed in the main body part,
   a first plurality of terminal electrodes formed on a face of the main body part so that at least one of the first terminal electrodes faces the first internal electrode,
   a first common terminal electrode formed on a face of the main body part so that the common terminal electrode connects with the internal electrode,
   a second internal electrode formed in the main body part, and
   a second plurality of terminal electrodes formed on a face opposite to the face on which the first plurality of terminal electrodes is formed so that at least one of the second terminal electrodes faces the second internal electrode.

7. A capacitor having a changeable dielectric capacity according to claim 6,
   wherein the second internal electrode faces all of the second plurality of terminal electrodes.

8. A method for manufacturing a capacitor having a changeable dielectric capacity, said method comprising the steps of:
- a) preparing a ceramic main body part having first and second internal electrodes therein,
- b) applying a paste onto a face of the ceramic main body part to form a first plurality of terminal electrodes so that at least one of the first terminal electrodes faces the first internal electrode,
- c) drying and calcining the resulting main body part,
- d) applying a paste onto a face of the ceramic main body part to form a first common terminal electrode so that the first common terminal electrode connects with both of the first and second internal electrodes,
- e) drying and calcining the resulting main body part, and
- f) forming a second common terminal electrode on a face opposite to the face on which the first common terminal electrode is formed.

9. A method for manufacturing a capacitor having a changeable dielectric capacity according to claim 8, including:
  using barium titanate to prepare said ceramic main body part.

10. A method for manufacturing a capacitor having a changeable dielectric capacity according to claim 8, including:
  facing the first internal electrode toward all of the first plurality of terminal electrodes.

11. A method for manufacturing a capacitor having a changeable dielectric capacity according to claim 8, further comprising a step of:
  plating nickel and soft solder on all of the first terminal electrodes and the first common terminal electrodes.

12. A method for manufacturing a capacitor having a changeable dielectric capacity, said method comprising the steps of:
- a) preparing a ceramic main body part having first and second internal electrodes therein,
- b) applying a paste onto a face of the ceramic main body part to form a first plurality of terminal electrodes so that at least one the first terminal electrodes faces the first internal electrode,
- c) drying and calcining the resulting main body part,
- d) applying a paste onto a face of the ceramic main body part to form a first common terminal electrode so that the first common terminal electrode connects with both of the first and second internal electrodes,
- e) drying and calcining the resulting main body part, and
- f) forming a second plurality of terminal electrodes on a face opposite to the face on which the first plurality of terminal electrodes is formed so that at least one the second terminal electrode faces the second internal electrode.

13. A method for manufacturing a capacitor having a changeable dielectric capacity according to claim 12, wherein the second internal electrode faces all of the second plurality of terminal electrodes.

* * * * *